United States Patent [19]

Livingston et al.

[11] 3,845,916

[45] Nov. 5, 1974

[54] CARTRIDGE FOR ELONGATED RECORD MEDIUM

[75] Inventors: Daniel K. Livingston, Maple Shade; Bjorn Fritjof Floden, Palmyra; Harry Gilbert Wright, Haddonfield; Wei Hwa Tsien, Cherry Hill, all of N.J.

[73] Assignee: RCA Corporation, New York, N.Y.

[22] Filed: Nov. 19, 1973

[21] Appl. No.: 417,387

[30] Foreign Application Priority Data

Mar. 23, 1973 Great Britain .................... 14240/73

[52] U.S. Cl. ................ 242/197, 206/52 F, 242/192

[51] Int. Cl.... G03b 1/04, G11b 15/32, G11b 23/04

[58] Field of Search ............................ 242/192–200, 242/55.19 A; 274/4 B, 11 B; 206/52 F, 59 E; 352/72

[56] References Cited

UNITED STATES PATENTS

| | | | |
|---|---|---|---|
| 3,092,346 | 6/1963 | Goodell et al. | 242/197 |
| 3,495,787 | 2/1970 | Wallace | 242/199 |
| 3,682,415 | 8/1972 | Ibuchi | 242/197 |
| 3,712,557 | 1/1973 | Stenzenberger | 242/197 |

*Primary Examiner*—Leonard D. Christian
*Attorney, Agent, or Firm*—Eugene M. Whitacre

[57] ABSTRACT

A cartridge is provided for a reel of an elongated record web. The cartridge is comprised of demountable walled half sections which form a reel enclosure. The sections include integral structure for maintaining closure of the cartridge. Specifically located openings are provided in the walled sections for manipulation of the reel and record web. Structural configurations forming portions of half sections provide keying to assure proper reel and cartridge orientation.

12 Claims, 8 Drawing Figures

CARTRIDGE FOR ELONGATED RECORD MEDIUM

The invention relates to a cartridge for an elongated record web and more particularly to a cartridge which may be utilized in a magazine-fed, automated playback system.

A wide variety of cartridges designed to handle web like record members exists. Generally, the cartridges are intended to hold a web like material while some action takes place with respect thereto as material is moved within the cartridge. However, a need does exist for a cartridge which will completely enclose and safely store therein a web like member when not in use, permit the material to be removed from the cartridge when the material is to be acted upon, and thereafter permit the material to be returned to and maintained within the cartridge for further storage. Further, there is a need for such a cartridge which is insertable into and removable from a magazine which is movable with respect to the housing of a playback apparatus, in order to place a selected cartridge into a position for manipulation and playback of the record web. In such apparatus it is desirable to provide means for insuring that the cartridge is properly disposed for operating in the magazine to avoid interruption or disabling of the automatic playback apparatus. In addition, it is desirable to provide flexibility and selectivity in the material to be played back. Thus, it is advantageous to provide a cartridge which is easily removable, simply disassembled, and which assures proper substitution of different playback material and proper operation of the automated playback of the material. In addition, all of the capabilities of such a cartridge must be realized in a simple and economic manner consistent with a goal of minimizing operator participation and chance of error.

Briefly, in accordance with the invention, there is provided a cartridge for enclosing a flanged reel for an elongated record web. The cartridge comprises first and second members each having an end wall portion substantially parallel to a flange of the reel, and further side wall portions aligned to define with the end wall portions a hollow enclosure for the reel. A plurality of latching means are provided for demountably securing the first and second members together to form the enclosure. An elongated aperture is formed in a first of the side walls to provide access for moving the web. A further aperture formed in a side wall adjacent the first side wall provides entry and exit of the web. One of the end wall portions includes a third aperture for providing driving access to the reel. A first keying means is provided in one of the end walls for proper disposition of the reel in the cartridge. A further keying means establishes proper disposition of the cartridge in a cartridge holding means.

The invention will be understood by a reading of the following discussion taken in conjunction with the drawing, in which.

Figure 1:
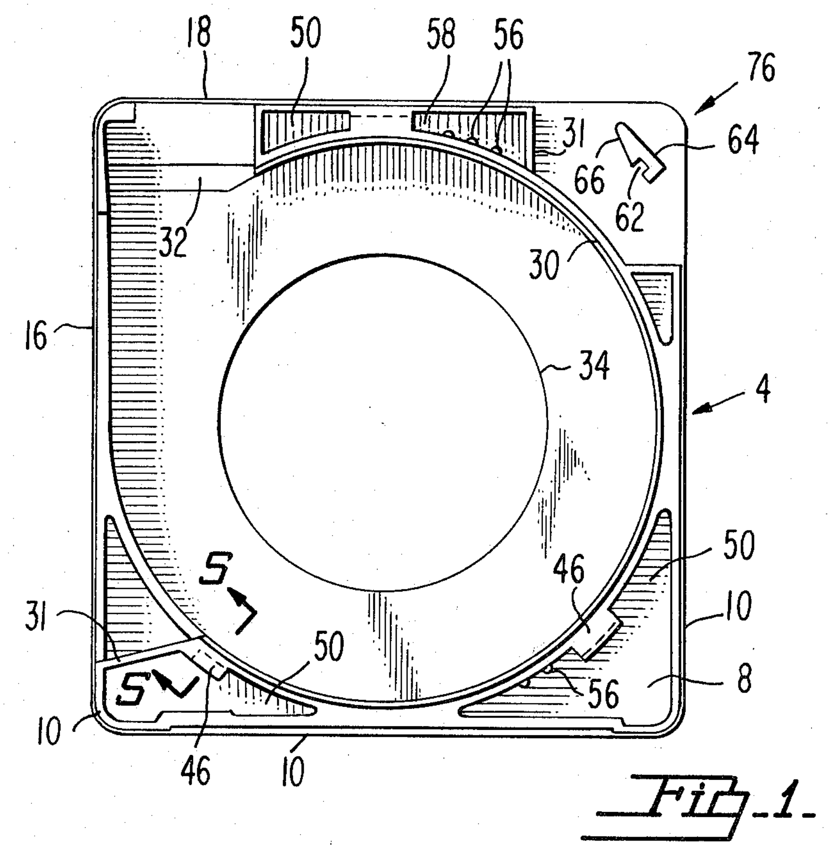
FIG. 1 is a plan view including internal structural features of a first member for forming a cartridge enclosure.

As shown in the figures, the cartridge 2 is comprised of first 4 and second 6 demountable members. Each of the members has an end wall portion 8 and side wall portions 10 which are alignable with those of the other member to define with end wall portions 8 a hollow enclosure for a reel 12. The cartridge members 4 and 6 and their accompanying structure may be formed, for example, by injection molding of a plastic material such as "Lexan" polycarbonate resin, a product of General Electric Company Plastics Department, Pittsfield, Massachusetts 01201. The end wall portions 8 of the members 4 and 6 are arranged substantially parallel to the flanges 14,15 of the reel 12.

Figure 2:
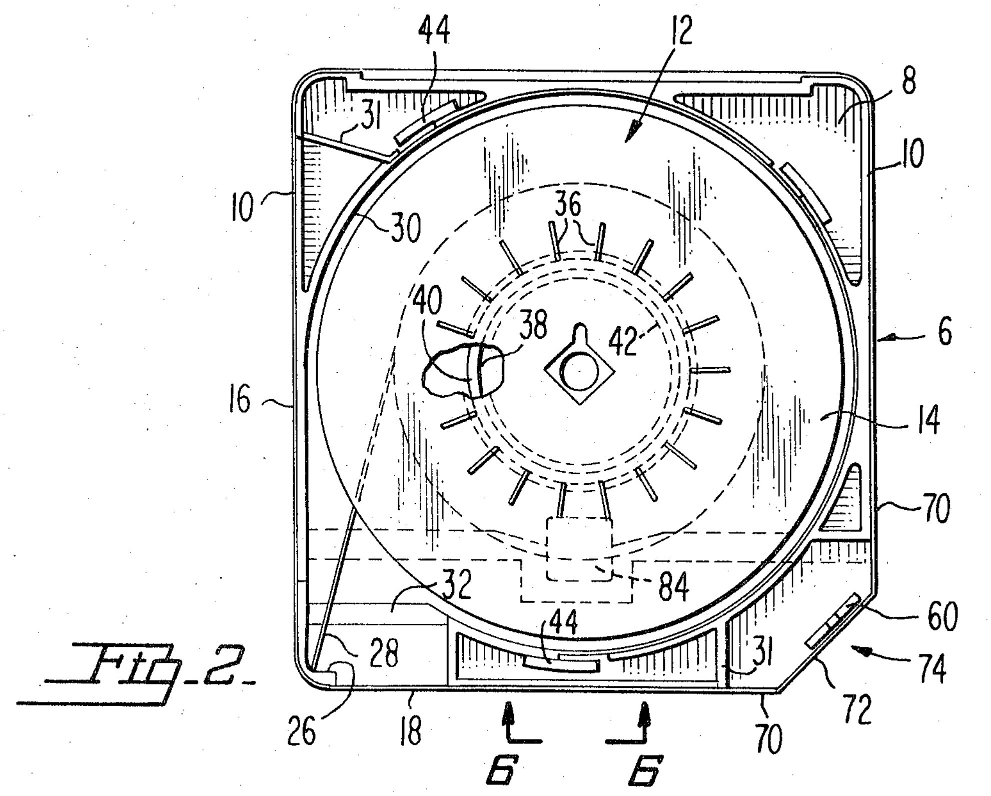
FIG. 2 is a plan view including a record web reel and internal structural features of a further enclosing member which, together with the member of FIG. 1, forms a reel cartridge.
Figures 3, 4, 5, 6, 7, 8:
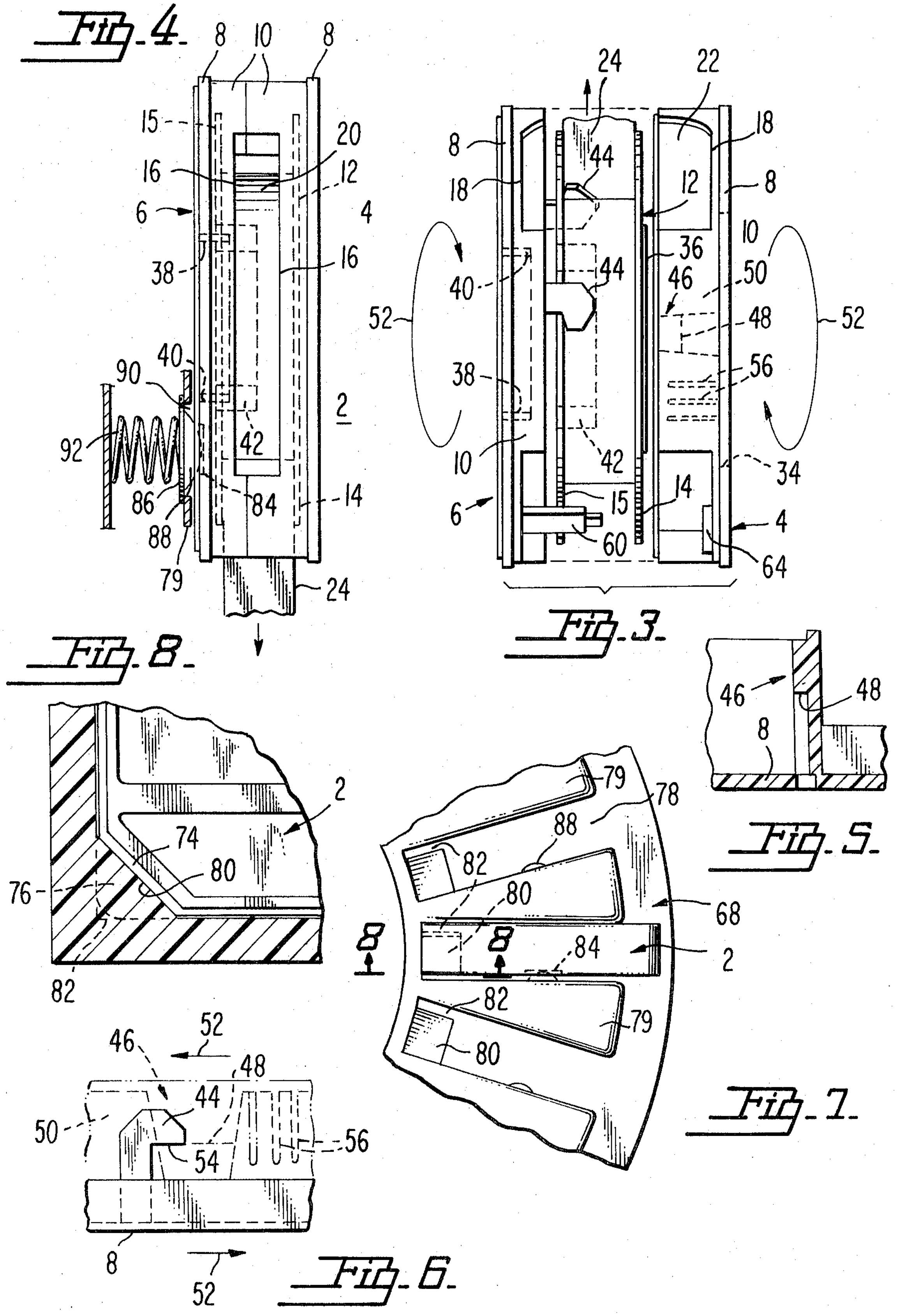
FIG. 3 is a disassembled side view of the members of FIGS. 1 and 2 oriented for forming an enclosure for a web reel.
FIG. 4 is a further side view showing the members of FIGS. 1 and 2 in mated enclosing relation and a portion of a cartridge magazine.
FIG. 5 is a sectional view of a portion of the latch structure of FIG. 1.
FIG. 6 is a detail sectional end view showing the cooperation of structural portions of the members of FIGS. 1 and 2.
FIG. 7 is a plan view of a cartridge holding magazine apparatus.
FIG. 8 is a detail sectional side view of a portion of the arrangement of FIG. 7.

Each of the members 4,6 has a pair of cutout portions 16,18 in adjacent side walls of the member. When the members are disposed in enclosing relation, the cutout portions 16,18 in the members 4,6 form respective apertures 20,22 in the enclosure, as shown in FIGS. 3 and 4. The aperture 20 provides access for a rotary puck or similar device, not shown. The rotary puck extends through the aperture 20 into contacting relation with the outer convolution of a record web 24, such as a film, which is wound on the reel 12. In response to the operation of the rotary puck the film 24 may be caused to be fed out of the enclosure through the aperture 22. As shown in the figures, a lip or wall portion 26 is provided adjacent the aperture 22. As shown in FIG. 2, this lip 26 is effective in engaging the leading or free end 28 of the film. The film on the reel is preferably fitted with a relatively stiff leader portion which enhances engagement between the free film end 28 and the lip 26. Insertion of the rotary puck through the aperture 20 causes movement of the free end of the film toward the hub of the reel 12, thereby disengaging the leading portion 28 from the lip 26, permitting free exit of the film through the aperture 22.

The plan views of FIGS. 1 and 2 show the internal portions of members 4 and 6. As shown particularly in FIGS. 1 and 2, each of the members 4,6 has a raised portion forming an inner wall 30 joined to the end wall portion and extending about the central area of the respective members 4,6, with the exception of the portion leading to the web entry-exit aperture 22. The inner wall 30 is also intercoupled with the side wall portions 10 at various locations by further wall like members 31. The diameter of the circular inner wall 30 of each of the members is dimensioned to accept reel flanges 14,15, but permit free rotation of the reel 12 with respect to the members 4,6. Sloped portions 32 formed in the wall 8 of the members 4,6 at the discontinuity of the inner wall 30 enhance movement of the film 24 through the aperture 22.

As shown in FIG. 1, the cartridge member 4 includes a circular aperture 34 through the end wall 8 thereof. The circular aperture 34 is arranged in substantial alignment with and provides access to the flange 14 of the reel. As shown in the figures, a plurality of raised portions or ribs 36 are provided on the exterior surface of the reel flange 14 which faces the aperture 34. The ribs 36 are disposed in a circular spaced pattern on the reel flange 14 and are adapted to be contacted by a disc driving member, not shown, through the aperture 34. The rib members 36 are effective in coupling drive force to the reel 12 from the disc when it is desired to rotate the reel for returning the record web 24 to the cartridge 2.

To provide proper orientation or keying of the reel 12 within the cartridge enclosure 2, a further aperture 38 is provided in the end wall of the member. The aperture 38 is preferably of circular configuration. Disposed about the periphery of the aperture 38 is a raised collar member 40 affixed to the end wall of member 6 and extending into the interior portion of the cartridge enclosure. The collar 40 is dimensioned to be nested within a circular channel or trough 42 in the reel flange 15. The circular channel 42 preferably is provided in the surface of the reel flange 15 which is opposite the flange 14 of the reel which contains the upstanding rib members 36. It will be understood, therefore, that proper joining of the members 4,6 to form the enclosure about the reel 12 is possible only when the reel flanges 14,15 are disposed with respect to the members 4,6 as shown in FIGS. 3 and 4. An attempt to insert the reel 12 otherwise causes an interference between the collar member 40 and the ridged flange 14 of the reel.

The first 4 and second 6 members comprising the cartridge 2 are secured in enclosing relation by a plurality of latching or holding means and a locking means. The latching means includes a number of generally hook shaped elements 44 spaced about the member 6. The hook shaped elements 44 are disposed in cantilevered manner with respect to the member 6 and extend in a direction of the mating member 4 of the cartridge. Holding means 46 for captively engaging the hook like elements 44 are spaced about the member 4 at locations substantially corresponding to those of the hook like elements 44 of the member 6. The holding means 46 includes an engaging surface 48 facing but spaced from the end wall 8 of the member 4, as shown particularly in FIG. 5. Extending away from one side of the surface 48 is a recess 50 adapted to receive the hook like member 44.

For forming the enclosure about the reel, the first 4 and second 6 members and the reel 12 are relatively oriented as shown particularly in FIG. 3. The first and second members are brought together about the reel in a manner to dispose each of the hook like elements 44 in receptive ones of the recesses 50 adjacent the surfaces 48. Upon relative rotation of the first and second members 4,6, as indicated by the arrows 52 in FIGS. 3 and 6, the surface 54 of the hook like elements 44 are brought into captive engagement with the surface 48 of the holding means 46, thereby securing the first and second members in enclosing relation.

As shown in the figures, a series of raised ridge like members 56 are provided extending along the portion of the inner wall 30 which faces away from the central portion of the cartridge. The rib members 56 are disposed adjacent the side 58 of the engaging surface 48 which is opposite the recess 50 which is to receive the hook like elements 44. The ridge members 56 tend to inhibit undesirable disposition of the hook like elements 44 adjacent the side 58 of the engaging surface 48. Thus, the ridge members simplify and minimize chance of improper orientation of the first and second members 4,6 for forming the cartridge enclosure.

To maintain the enclosing relationship of the first and second members 4,6, a locking means is provided. The locking means includes a projection 60 mounted on and extending in cantilevered manner from an end wall 8 portion of the member 6. A notch 62 disposed in a raised portion 64 of an opposite end wall 8 of the member 4 is adapted to receive and maintain a portion of the projection 60 therein. The projection 60 and notch 62 are relatively oriented to cause an interference therebetween upon rotation of the first and second members, as indicated in FIG. 3. The cantilevered nature of the projection 60, which for example may be formed of a plastic, renders the projection compliant, thus allowing it to be deflected with respect to the central area of the cartridge 2. To enhance movement of the projection into the notch, a tapered surface 66 is provided adjacent the notch 64.

When it is desired to disassemble the cartridge first and second members 4,6, a force is exerted on the projection 60 inward toward the central area of the cartridge. This allows the projection 60 to pass out of the notch 62, as the first and second members are relatively rotated in directions opposite to those indicated by the arrows 52 of FIG. 3.

Further keying means are provided for insuring simple yet proper orientation and maintenance of the cartridge 2 in a movable cartridge holding device such as a magazine 68. An example of such a cartridge holding device 68 is shown in simplified form in FIG. 7. As shown in particular in FIG. 1, the cartridge member 4 has intersecting edges of the end wall 8 forming four generally orthogonal corners. Similarly, the member 6 of FIG. 2 has a series of intersecting end wall edges also forming a number of generally orthogonal corners. However, the member 6 in addition includes a pair of orthogonal edges 70 of the end wall intercepted by a further edge portion 72 forming therewith a recessed corner 74. When the first and second members 4,6 are assembled in enclosing relation, the recessed corner 74 of member 6 is disposed opposite and adjacent one of the orthogonal corners and more particularly the corner 76 of member 4. The slots 78 between partitions 79 in the cartridge holding magazine 68 are provided at one end thereof with a slope or ramp surface 80 and a recess 82 adjacent thereto. As shown particularly in FIG. 8, the recessed corner 74 of the cartridge 2 engages the ramp surface 80 while the recess 82 adjacent thereto receives the orthogonal corner 76 of the cartridge. It will be understood that an attempt to insert the cartridge 2 into the magazine slot 78 in another orientation will result in interference between the ramp 80 surface and an orthogonal corner of the cartridge.

Further, as shown in the figures, a depression 84 is formed in the exterior portion of the end wall 8 of member 6. The depression 84, although shown as having a square periphery, may have other shapes. The depression 84 preferably is made not to extend completely through the end wall of the member, in order to inhibit introduction of foreign matter into the internal enclosure of the cartridge. When the recessed corner 74 of the cartridge is in engagement with the magazine ramp 80, the depression 84 is enabled to receive the member 88, thereby detenting the cartridge 2 in desired position, as shown in FIG. 7. The member 86 may comprise an arcuate shaped projection 88 which is urged through an aperture 90 into engagement with an end wall 8 of the cartridge by means of a spring 92. The location of the depression 84 in the member 6 is such as to inhibit cooperation of the element 88 with the depression for other orientations of the cartridge 2 in the magazine 68.

What is claimed is:

1. A cartridge for enclosing a flanged reel for an elongated record web, comprising: first and second members each having an end wall portion substantially parallel to a flange of said reel and further side wall portions aligned to define with said end wall portions a hollow enclosure for said reel, a plurality of latching means for demountably securing said first and second members together to form said enclosure, an elongated aperture formed in a first of said side walls to provide access for moving said web, a further aperture in a side wall adjacent said first side wall to provide entry and exit of said web, one of said end wall portions including a third aperture for providing driving access to said reel, first keying means in one of said end walls for proper disposition of said reel in said cartridge, and further keying means establishing proper disposition of said cartridge in a cartridge holding means.

2. The invention according to claim 1, further including means adjacent said further aperture for engaging a free end of said web.

3. The invention according to claim 1, wherein said latching means includes a plurality of securing devices spaced about said cartridge, said devices comprising a hook like member on one of said first and second members, a recess in the other of said members for receiving said hook like member, and means for captively engaging said hook like member by relative rotation of said first and second members.

4. The invention according to claim 3, wherein said latching means further includes locking means comprising a compliant projection on one of said first and second members, and a notch in the other of said members to captively receive said projection.

5. The invention according to claim 3, wherein said recess extends way from one side of said engaging means, and means disposed to the other side of said engaging means for inhibiting positioning of said hook like member for cooperative relation with said engaging means.

6. The invention according to claim 1, wherein said first keying means includes means affixed to said wall and extending into said enclosure for cooperation with a portion of said reel.

7. The invention according to claim 6, including an aperture through said wall and a protruding collar surrounding said aperture.

8. The invention according to claim 1, wherein said further keying means includes: one of said end walls of said cartridge having intersecting edges thereof forming a generally orthogonal first corner, the other of said end walls having first and second orthogonal edge portions intercepted by a further edge portion forming a recessed corner opposite and adjacent said first corner.

9. The invention according to claim 1, wherein said further keying means includes a depressed region formed in an end wall surface which faces away from said reel, said region being configured to receive a protruding portion of a cartridge holding means.

10. The invention according to claim 1, wherein said first and second members each include a raised member secured thereto, said member extending about the interior of said enclosure to define a receiving recess for a reel.

11. The invention according to claim 1, comprising a reel disposed within said enclosure, said reel including a flange having a plurality of raised rib members accessible through said third aperture for rotation of said reel.

12. The invention according to claim 1, comprising a reel disposed within said enclosure, said reel including a flange having a groove therein for cooperation with said first keying means.

* * * * *

UNITED STATES PATENT OFFICE
CERTIFICATE OF CORRECTION

Patent No. 3,845,916 Dated November 5, 1974

Inventor(s) Daniel Kaye Livingston, Bjorn Fritzof Floden, Harry Gilbert Wright and Wei Hwa Tsien It is certified that error appears in the above-identified patent and that said Letters Patent are hereby corrected as shown below:

Column 1, line 24, portion reading "operating" should read --operation--;
Column 3, line 54, portion reading "receptive" should read --respective--

Signed and sealed this 10th day of June 1975.

(SEAL)
Attest:

RUTH C. MASON
Attesting Officer

C. MARSHALL DANN
Commissioner of Patents
and Trademarks